United States Patent
Morris

(10) Patent No.: US 11,580,563 B2
(45) Date of Patent: Feb. 14, 2023

(54) SYSTEM AND METHOD FOR SENDING DATA TO END USER DATA DELIVERY VEHICLES

(71) Applicant: AT&T Intellectual Property I, L.P., Atlanta, GA (US)

(72) Inventor: Nadia Morris, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1049 days.

(21) Appl. No.: 16/111,689

(22) Filed: Aug. 24, 2018

(65) Prior Publication Data

US 2018/0365712 A1 Dec. 20, 2018

Related U.S. Application Data

(62) Division of application No. 12/425,915, filed on Apr. 17, 2009, now Pat. No. 10,074,095.

(51) Int. Cl.
*G06Q 30/02* (2012.01)
*G06Q 30/0201* (2023.01)
*G06Q 30/0207* (2023.01)

(52) U.S. Cl.
CPC ......... *G06Q 30/0201* (2013.01); *G06Q 30/02* (2013.01); *G06Q 30/0207* (2013.01)

(58) Field of Classification Search
CPC .................................................. G06Q 30/02
USPC .......................................................... 705/14
See application file for complete search history.

(56) References Cited

U.S. PATENT DOCUMENTS

| 5,697,844 A | 12/1997 | Von et al. |
| 5,916,024 A | 6/1999 | Von et al. |
| 6,766,524 B1 | 7/2004 | Matheny et al. |
| 6,970,833 B1 | 11/2005 | Fuchs et al. |
| 7,430,495 B1 | 9/2008 | Govindan et al. |
| 7,469,269 B2 | 12/2008 | Klein et al. |
| 7,499,704 B1 | 3/2009 | Bonner et al. |
| 7,509,124 B2 | 3/2009 | O'Neil |
| 2002/0013174 A1 | 1/2002 | Murata et al. |
| 2002/0078045 A1 | 6/2002 | Dutta et al. |
| 2003/0074660 A1 | 4/2003 | McCormack et al. |
| 2004/0009762 A1 | 1/2004 | Bugiu et al. |
| 2005/0096976 A1 | 5/2005 | Nelms et al. |
| 2007/0156530 A1 | 7/2007 | Schmitt et al. |
| 2007/0271578 A1 | 11/2007 | Thenthiruperai et al. |
| 2007/0288952 A1 | 12/2007 | Weinblatt et al. |

(Continued)

FOREIGN PATENT DOCUMENTS

WO 2007130052 A1 11/2007

*Primary Examiner* — Cho Kwong
(74) *Attorney, Agent, or Firm* — Guntin & Gust, PLC; Andrew Gust

(57) ABSTRACT

Aspects of the subject disclosure may include, for example, dividing a reward token in a reward token data base into a plurality of reward token pieces based on a selection of plurality of end user data delivery vehicles, sensing end user activity on a communication network on one of the plurality of end user data delivery vehicles at one of a plurality of data delivery vehicle servers, sending from a first one of the plurality of data delivery vehicle servers, a first one of the plurality of reward token pieces to the end user on a first one of the plurality of end user data delivery vehicles, and sending from a second one of the plurality of data delivery vehicle servers, a second one of the plurality of reward token pieces to the end user on a second one of the plurality of end user data delivery vehicles.

20 Claims, 5 Drawing Sheets

(56) References Cited

U.S. PATENT DOCUMENTS

2008/0295127 A1 11/2008 Zmuda et al.
2009/0055860 A1 2/2009 Knoller et al.
2009/0147786 A1 6/2009 Li et al.

SYSTEM AND METHOD FOR SENDING DATA TO END USER DATA DELIVERY VEHICLES

CROSS REFERENCE TO RELATED APPLICATIONS

This application is a divisional of U.S. patent application Ser. No. 12/425,915 filed on Apr. 17, 2009, now U.S. Patent Pub. No. 2010/0268576. All sections of the aforementioned application(s) and patent(s) are incorporated herein by reference in their entirety.

FIELD OF DISCLOSURE

The disclosure relates to the field of video data distribution systems and more specifically to systems and methods for sending data to end users.

BACKGROUND

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content data choices available to subscribers.

DETAILED DESCRIPTION

Figure 1:
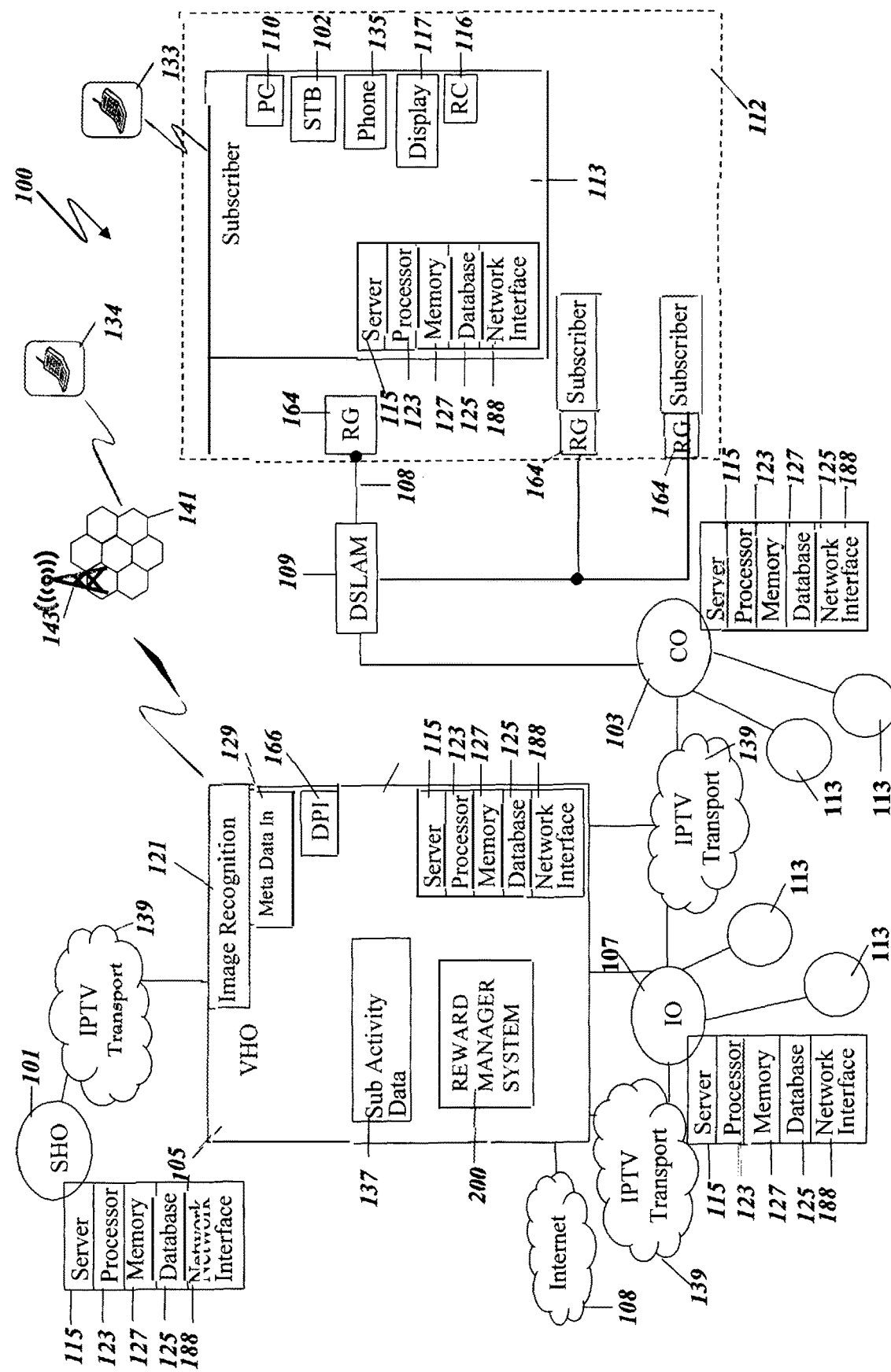
FIG. 1 is a depiction of an Internet protocol television (IPTV) system in a particular illustrative embodiment.

An illustrative embodiment monitors end user activity data of an end user on one or more of several end user data delivery vehicles associated with the end user. In one illustrative embodiment, end user data delivery vehicles are delivery mechanisms such as end user devices and end user applications through which an end user receives data and data services such as telephone, Internet and video. A reward server monitors the end user activity of end users and end user data delivery vehicles. The number of end user data delivery vehicles associated with a particular end user ranges from 1 to N. In a particular embodiment, a provider, such as an advertiser selects end user data delivery vehicles at an advertising server based on desired advertising impression demographics or a desired data delivery vehicle usage associated with a particular product affinity.

In another particular embodiment, a provider such as a communications company can select end user data delivery vehicles and send reward token pieces to the selected end user data delivery vehicles to incentivize use of end user data delivery vehicles receiving the reward token pieces. Thus, if a particular end user has a favorite or most utilized end user device type, a provider can direct a reward server to send a reward token piece to the end user device indicated by the favorite end user device type. In another embodiment, the reward server sends a reward notice to the favorite end user data delivery vehicle that a reward token piece is available on a second end user device having an end user device type, which may be different than the favorite end user device type. Thus, the end user is provided an incentive to utilize the second end user device type to collect the reward token piece. In another embodiment, end users collect all N reward token pieces to receive credits for value which can be redeemed for points used to pay for services or merchandise.

Similarly, if a particular end user has a favorite or most utilized end user application or application type, a provider can direct the reward server to send to the end user application indicated by the favorite application or application type, a reward token piece and/or a notice that a reward token piece is available on a second end user application or application type, which may be different than the favorite end user application or application type. Thus, the end user is provided an incentive reward token piece to utilize the second end user application or application type to collect the reward token piece.

In a particular embodiment, a reward server communicates with data delivery vehicle servers sends reward tokens by sending reward token pieces to selected end user data delivery vehicles via an IPTV system. End user data delivery vehicles are selected in various ways, including but not limited to selecting end user data delivery vehicles associated with a particular end user based on a correlation between an end user's profile; or an affinity for a product and an advertiser's desired target demographic or a tendency for a product affinity correlated with affinity for particular end user applications and particular end user device types.

An advertiser bids on a group of end user data delivery vehicles selected based on several factors, including but not limited to, end user demographics, application usage trends correlated with product affinity trends, end user device type usage correlated with product affinity trends, and end user device types based on the end user demographics, end user device usage and end user device application activity. Advertisers may desire to reach certain type devices or certain applications, to ride a certain wave or trend in which a particular demographic which has an affinity for a certain product. Product affinity for a particular product is determined by monitoring end user activity data indicating demographics, device types and applications/application type that looks at, discusses, searches for or uses the particular product.

For example, if an advertiser knows that most of the 12-14 year olds boys are now using Twitter™, the advertiser can send reward token pieces to the end user application, Twitter™, in order to reach the 12-14 year old boys. Advertisers can incentivize end users to utilized different and additional end user client devices (cell phones, lap top computers, portable media players (for example, Apple iPod™) and different applications (text messaging, Twitter, etc.) on the different end user client devices by sending reward token pieces to different devices and different applications on the different devices. In another embodiment, advertisers or providers can incentivize different IPTV television programs or channels by sending reward token pieces to an end user device on a particular IPTV channel or IPTV program and announcing the delivery of the reward token piece on an end user's favorite channel or IPTV program.

In another particular embodiment, a method is disclosed including but not limited to dividing a reward token in a reward token data base into a quantity, N of reward token pieces based on a selection of N end user data delivery vehicles on which an advertiser wants to send reward token pieces to an end user; sensing end user activity on a communication network on at least one of the N end user data delivery vehicles at one of a plurality of data delivery vehicle servers; sending from a first data delivery vehicle server, a first one of the N reward token pieces to the end user on a first one of the N end user data delivery vehicles; and sending from a second data delivery vehicle server, a second one of the N reward token pieces to the end user on a second one of the N end user data delivery vehicles.

In another particular embodiment of the method, the first data delivery vehicle server further includes but is not limited to an end user application server and the first one of the plurality of end user data delivery vehicles further includes but is not limited to an end user device application, the method further including but not limited to detecting the end user application at the end user device application server, wherein the device application is selected from the group consisting of instant messaging, video, cellular telephone, text messaging and games. In another particular embodiment of the method the first one of the N end user data delivery vehicles further includes but is not limited to a favorite end user device type, the method further including but not limited to detecting the favorite end user device type at an end user device server. In another particular embodiment of the method, an advertiser selects end users, end user device types and end user applications associated with the selected end user to receive the reward token pieces.

In another particular embodiment of the method, the method further includes but is not limited to rewarding the end user for accumulation of each of the N reward token pieces on an end user data delivery vehicle, wherein the reward value is inversely proportional to an end user's historical utilization of the end user data delivery vehicle. In another particular embodiment of the method, the method further includes but is not limited to selecting the second end user data delivery vehicle based on increasing an end user's historical utilization of the second end user data delivery vehicle; and sending data indicating on the first data delivery vehicle that the second reward token piece is available on the second end user data delivery vehicle.

In another particular embodiment of the method, the method further includes but is not limited to monitoring end user data delivery vehicle activity for the end user; and ranking the end user's data delivery vehicle activity by historical utilization of at least one of the group consisting of historical utilization of each of the plurality of end user device types, historical utilization of each of the plurality of end user applications and historical utilization of each end user application on each of the plurality of end user device types. In another particular embodiment of the method, the method further includes but is not limited to weighting the historical utilization of each of the plurality of end user device types, the historical utilization of each of the plurality of end user applications and the historical utilization of each end user application on each the plurality of end user device types, based on an desired target profile.

In another particular embodiment a computer program product is disclosed including but not limited to a tangible computer readable medium containing a computer program comprising computer readable instructions that when executed by a computer perform a function, the computer program comprising instructions to divide a reward token in a reward token data base into a quantity, N of reward token pieces based on a selection of N end user data delivery vehicles on which an advertiser wants to send reward token pieces to an end user; instructions to sense end user activity on a communication network on at least one of the N end user data delivery vehicles at one of a plurality of data delivery vehicle servers; instructions to send from a first data delivery vehicle server, a first one of the N reward token pieces to the end user on a first one of the N end user data delivery vehicles; and instructions to send from a second data delivery vehicle server, a second one of the N reward token pieces to the end user on a second one of the N end user data delivery vehicles.

In another particular embodiment of the medium, the first data delivery vehicle server is an end user application server and the first one of the plurality of end user data delivery vehicles further includes but is not limited to an end user device application, the computer program further comprising instructions to detect the end user application at the end user device application server, wherein the device application is selected from the group consisting of instant messaging, video, cellular telephone, text messaging and games. In another particular embodiment of the medium, the first one of the N end user data delivery vehicles further includes but is not limited to a favorite end user device type, the medium the computer program further includes but not limited instructions to detect the favorite end user device type at an end user device server. In another particular embodiment of the medium, an advertiser selects end users, end user device types and end user applications associated with the selected end user to receive the reward token pieces.

In another particular embodiment of the medium, the computer program further includes but is not limited to instructions to reward the end user for accumulation of each of the N reward token pieces on an end user data delivery vehicle, wherein the reward value is inversely proportional to an end user's historical utilization of the end user data delivery vehicle. In another particular embodiment of the medium, the computer program further includes but is not limited to instructions to select the second end user data delivery vehicle based on increasing an end user's historical utilization of the second end user data delivery vehicle; and instructions to send data indicating on the first data delivery vehicle that the second reward token piece is available on the second end user data delivery vehicle.

In another particular embodiment of the medium, the computer further includes but is not limited to instructions to monitor data delivery vehicle activity for the end user; and instructions to rank the end user's data delivery vehicle activity by historical utilization of at least one of the group consisting of historical utilization of each of the plurality of end user device types, historical utilization of each of the plurality of end user applications and historical utilization of each end user application on each of the plurality of end user device types. In another particular embodiment of the medium, the instructions to rank further comprise instructions to weight the historical utilization of each of the plurality of end user device types, the historical utilization of each of the plurality of end user applications and the historical utilization of each end user application on each the plurality of end user device types, based on an desired target profile.

In another particular embodiment, a system is disclosed including but not limited to a processor in data communication with a tangible computer readable medium, the tangible computer readable medium containing a computer program comprising instructions that when executed by a computer perform a function; a first computer program component that divide a reward token in a reward token data base into a quantity, N of reward token pieces based on a selection of N end user data delivery vehicles on which an advertiser wants to send reward token pieces to an end user; a plurality of data delivery vehicle servers that sense end user activity on a communication network on at least one of the N end user data delivery vehicles at one of a plurality of data delivery vehicle servers, wherein a first one of the plurality of data delivery vehicle servers, sends a first one of the N reward token pieces to the end user on a first one of the N end user data delivery vehicles and a second one of the plurality of data delivery vehicle servers, sends a second one of the N reward token pieces to the end user on a second one of the N end user data delivery vehicles.

In another particular embodiment of the system, the first data delivery vehicle server further includes but is not limited to an end user application server and the first one of the plurality of end user data delivery vehicles further includes but is not limited to an end user device application, wherein the end user application server detects the end user application at the end user application server, wherein the device application is selected from the group consisting of instant messaging, video, cellular telephone, text messaging and games. In another particular embodiment of the system, the first one of the N end user data delivery vehicles further includes but is not limited to a favorite end user device type; the system further includes but is not limited to an end user server configured to detect the favorite end user device type.

In another particular embodiment of the system, an advertiser selects end users, end user device types and end user applications associated with the selected end user to receive the reward token pieces, wherein the end user is rewarded for accumulation of each of the N reward token pieces on an end user data delivery vehicle, wherein the reward value is inversely proportional to an end user's historical utilization of the end user data delivery vehicle and the second end user data delivery vehicle is selected based on increasing an end user's historical utilization of the second end user data delivery vehicle, wherein data is sent on the first data delivery vehicle indicating that the second reward token piece is available on the second end user data delivery vehicle.

In another particular embodiment, a method is disclosed including but not limited to receiving on a first end user data delivery vehicle from a first data delivery vehicle server, a first one of N reward token pieces; receiving on the first end user data delivery vehicle from the first data delivery vehicle server, data indicating that a second reward token piece is available on a second end user data delivery vehicle, wherein the second end user data delivery vehicle is selected based on increasing an end user's historical utilization of the second end user data delivery vehicle; and receiving a second one of the N reward token pieces on the second end user data delivery vehicle.

In another particular embodiment, a tangible computer readable medium containing a computer program including but not limited to computer readable instructions that when executed by a computer perform a function, the computer program including but not limited to instructions to receive on a first end user data delivery vehicle from a first data delivery vehicle server, a first one of N reward token pieces; instructions to receive on the first end user data delivery vehicle from the first data delivery vehicle server, data indicating that a second reward token piece is available on a second end user data delivery vehicle, wherein the second end user data delivery vehicle is selected based on increasing an end user's historical utilization of the second end user data delivery vehicle; and instructions to receive a second one of the N reward token pieces on the second end user data delivery vehicle.

In another particular embodiment, a system is disclosed, including but not limited to a processor in data communication with a tangible computer readable medium, the tangible computer readable medium containing a computer program comprising instructions that when executed by a computer perform a function; a first computer program component that receives on a first end user data delivery vehicle from a first data delivery vehicle server, a first one of N reward token pieces; a second computer program component that receives on the first end user data delivery vehicle from the first data delivery vehicle server, data indicating that a second reward token piece is available on a second end user data delivery vehicle, wherein the second end user data delivery vehicle is selected based on increasing an end user's historical utilization of the second end user data delivery vehicle; and a third computer program component that receives a second one of the N reward token pieces on the second end user data delivery vehicle.

Turning now to FIG. 1, in Internet protocol television (IPTV) system is shown delivering, Internet data and telephonic data and Internet protocol (IP) video television data to a client device. The IPTV system provides electronic data services to end users including but not limited to Internet, text messaging, telephonic (cellular and landline), video, audio and other electronic data services. The IPTV system 100 delivers video data including but not limited to content and different reward token pieces data to end users via end user devices and applications, to subscriber house holds 113 and associated end user devices (also referred to herein as client devices) which may be inside or outside of the household.

In the IPTV system 100, IPTV channels are first broadcast in an Internet protocol (IP) data format from a server at a super hub office (SHO) 101 to a regional or local IPTV video hub office (VHO) server 103, to an intermediate office (10) server 107 and to a central office (CO) 103. The IPTV system 100 includes a hierarchically arranged network of servers wherein a particular embodiment the SHO transmits video and advertising data to a video hub office (VHO) 103 and the VHO transmits to an end server location close to a subscriber, such as a CO server 103 or IO 107. In another particular embodiment, each of the SHO, VHO, CO and IO are interconnected with an IPTV transport 139. The IPTV transport 139 may consist of high speed fiber optic cables interconnected with routers for transmission of Internet protocol data. The IPTV servers also provide data communication for Internet, applications and voice over Internet protocol (VoIP) services to subscribers.

Actively viewed IPTV channels are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. Analysis of the video data for advertising data key insertion is performed by processor 123 at the VHO. The network interface functions to send and receive data over the IPTV transport. The CO server delivers IPTV, Internet, telephonic data and VoIP content to the subscriber end user devices via the IO and DSLAM. The television content is delivered via multicast and television advertising data via unicast or multicast depending on a target television advertising group of end user client subscriber devices.

In another particular embodiment, subscriber devices, also referred to herein as end user devices, are different stationary and mobile end user devices, including but not limited to, wire line phones 135, portable phones 133, lap top computers 118, personal computers (PC) 110 and STBs 102, 119 communicate with the communication system, i.e., IPTV system through residential gateway (RG) 164 and high speed communication lines such as IPTV transport 139.

In another particular embodiment, DPI devices 166 inspect data VoIP, Internet data and IPTV video, commands and Meta data (multicast and unicast) between the subscriber devices and the IPTV system severs. When authorized by end users, but only when authorized by end users, DPI devices are used in analysis of data sent and received by end user devices including but not limited to video, text messaging, Internet communications and telephonic communications provided by the IPTV system and stored in the data base 125. In a particular embodiment the video data stream is analyzed for imagery, text and audio instances of a particular object selected in the video data stream, such as an actress, e.g. Jessica Alba, adding Meta data descriptions as images of Jessica Alba are detected are detected by image recognition devices 121 associated with the DPI devices. Image, text and sound recognition functions are used to analyze video data for insertion of Meta data describing the video, in association with the DPI devices. Textual and aural key words and imagery found in the video data stream are inspected by the DPI devices 166 and image recognition functions 121 in the processors 123 in the communication system servers and are used as key words for storing in subscriber activity data for each end user. The keywords in the subscriber activity data are used to determine end user's affinity for a particular product or service, based on historical activity for purchases of services and merchandise.

In another particular embodiment, the end client user devices or subscriber devices include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data stream, including but not limited to VoIP data, Internet data and IPTV video, commands and Meta data between the subscriber devices and between subscriber devices and the IPTV system severs.

In another illustrative embodiment data are monitored and collected whether or not the subscriber devices are in the household 113 or the devices are mobile devices 134 outside of the household. When outside of the household, subscriber mobile device data is monitored by communication system (e.g. IPTV) servers which associate an end user profile in the subscriber activity data for each particular end user's device. In another particular embodiment, end user profile data including subscriber activity data such as communication transactions are inspected by DPI devices located in a communication system, e.g., IPTV system servers. These communication system servers route the subscriber profile data to a VHO in which the profile data for a subscriber are stored for processing in determining product or service affinity, that is, products that are likely to be of interest to a particular end user. If a user has an affinity for a particular luxury automobile then instances of imagery, text or audio data occurring in the video data stream can be described in the Meta data accompanying the video data stream for presentation to a particular user having an interest in the particular luxury automobile. The same or similar Meta data can be targeted to other subscriber's in a demographic sector having sufficient income to purchase the particular luxury automobile.

As shown in FIG. 1 advertising sub groups 112 (comprising a group of subscriber house holds 113) can receive ITPV data in a from IO server 107 via CO 103 and DSLAM 109 at STB 102. Individual households 113 receive the IPTV data including the reward token pieces data at set top box 102 or one of the other mobile or stationary end user devices. More than one STB (see STB1 102 and STB2 119) can be located in an individual household 113 and each individual STB can receive a separate multicast or unicast advertising stream on IPTV transport 139 through DSLAM 109. In another particular illustrative embodiment separate and unique reward token pieces data are presented at each set top box (STB) 102, 119 tailored to target the particular subscriber watching television at that particular STB. Each STB 102,119 has an associated remote control (RC) 116 and video display 117. The subscriber via the RC selects channels for a video data viewing selection (video programs, games, movies, video on demand) and places orders for products and services over the IPTV system 100. Reward token pieces data are generated and inserted at the VHO and sent to client devices in the IPTV content data for end user devices and end user applications. In another embodiment the reward token pieces data are sent to end user devices or end user application apart from the content data. In another embodiment, Meta data are generated at the end user devices by processors at the end user devices. Meta data at the end user devices can then be selected for display by the end user devices based on processing of the Meta data described herein.

FIG. 1 depicts an illustrative communication system, including but not limited to an IPTV system in which reward token pieces data can be inserted at an IPTV (SHO, VHO, CO) server or at the end user client subscriber device, for example, an STB, mobile phone, web browser or personal computer. Reward token pieces data can be inserted for selected objects appearing in video data, into an IPTV video stream via Meta data insertion device 129 at the IPTV VHO server 105 or at one of the STBs 102, 109. The IPTV servers include reward manager system 200. In another embodiment the reward manager system is separate from and external to the IPTV system 100. An SHO 101 distributes data to a regional VHO 103 which distributes the IPTV data and reward token pieces data to local COs 105 which distribute data via IO 107 to a digital subscriber access line aggregator multiplexer (DSLAM) access node to subscriber devices such as STBs 102, 119, PC 110 wire line phone 135, mobile phone 133 etc. Objects appearing in the video data stream are also selected for Meta data description based on the community profile for users in the community and sent to a mobile phone or computer associated with the subscriber or end user devices in the community. The community subscriber profile is built based on a community of subscribers' IPTV, Internet and VoIP activity.

Figure 2:
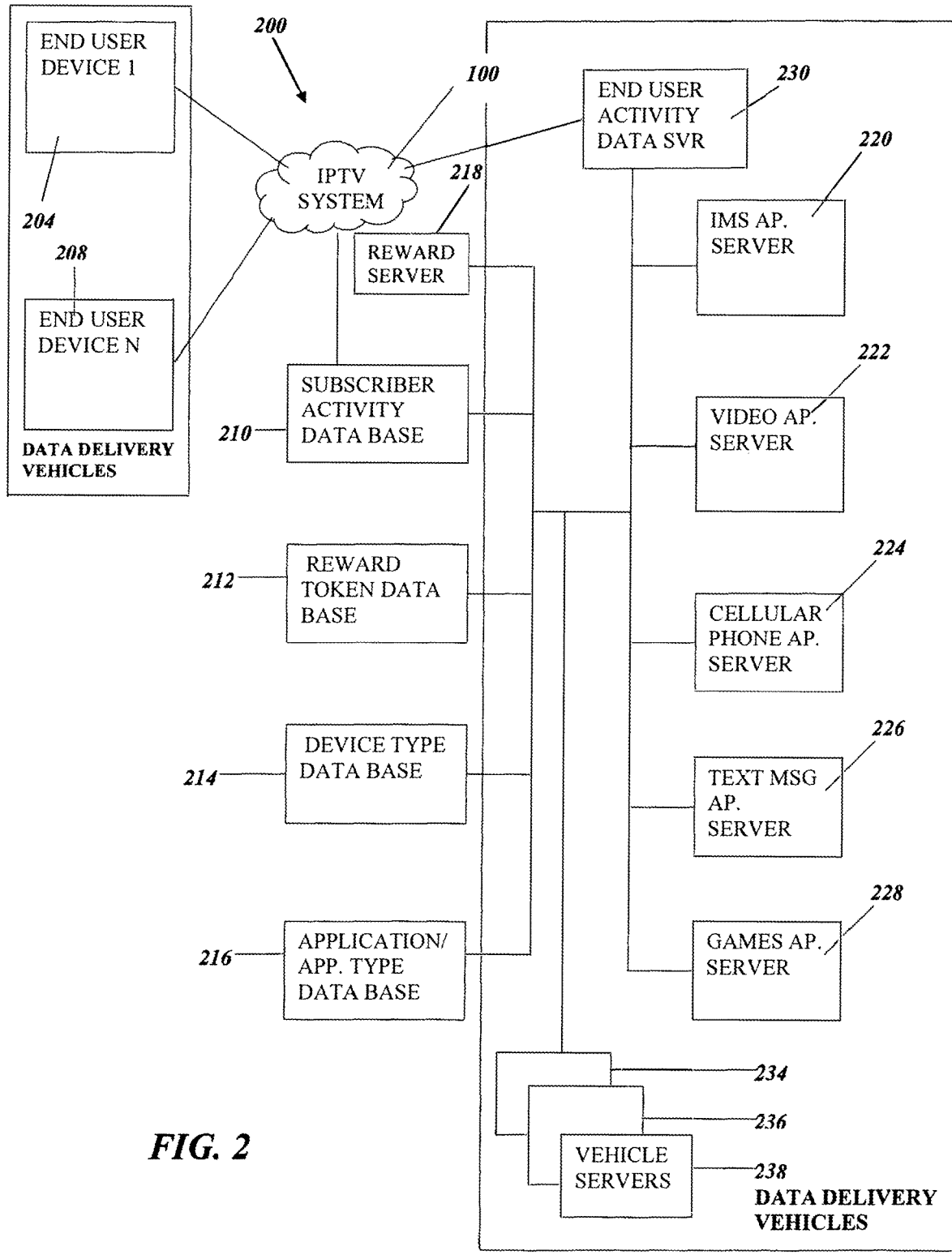
FIG. 2 is a depiction of system for managing rewards sent to end users in a particular illustrative embodiment.

Turning now to FIG. 2, an example of a particular illustrative embodiment 200 is depicted. As shown in FIG. 2, end user devices 204 and 208 communicate with an IPTV system which provides IPTV, telecommunications and Internet services to the end user devices. Each server in embodiment 200, as shown in FIG. 1 and FIG. 2 further includes but is not limited to a memory embedded in a tangible computer readable medium, a processor in data communication with the memory, and a database embedded in the tangible computer readable medium. An end user activity server 230 monitors end user device 204 and 208 activity to determine what end user device types for end user devices 204 and 208. The end user activity server 230 monitors what type of end user devices are used and stores the end user device types in the end user device type data base 214 associated with an end user identifier for an end user associated with the end user device type. The end user activity server 230 also monitors what type of end user applications are used and stores them in the application type data base 216. End user device type utilization and end user application utilization are monitored for end users and stored in the subscriber activity data base 210 in a historical utilization data structure embedded in a tangible computer readable medium.

Based on the historical utilization of particular end user device types and particular end user applications, providers such as advertisers and communication companies can target end user data delivery vehicles such as end user device types and end user applications to receive reward token pieces as incentives to read advertisements, utilize particular end user device types and utilize particular end user applications.

A reward token data base 212 stores data representing rewards which are redeemable by end users for value. Reward tokens represent a particular reward value which is divided into N reward token pieces, each N reward token piece having an assigned value, representing a fraction of the total reward value assigned to the reward token which was divided into the N reward token pieces. Reward token pieces sent to a favorite end user device type or sent to a favorite end user application may represent less value reward token pieces than the reward value for reward token pieces sent to a second end user device type or end user application. Thus, an end user is provided with an incentive to utilize the second end user device type or end user application to receive the higher value reward token pieces. That is, more value can be assigned to reward token piece sent to lesser used application and device types to provide an incentive to increase use of the lesser used application and device type.

Data delivery vehicle servers 234, 236 and 238 including but not limited to end user device servers and application servers send reward token pieces to reward server 218. The data delivery vehicle servers identify reward token pieces, end user devices, end users and end user applications and sends them to the reward server. The reward server communicates with the IPTV system 100 which sends the reward token pieces to the end user data delivery vehicles, which in a particular embodiment are end user device types and end user applications or application types. In another embodiment the end user data delivery vehicle may be a particular communication network or another electrical communication means through which an end user communicates.

Application servers, including but not limited to those shown in FIG. 2, Instant messaging server 220, video server 222, cellular telephone server 224, text messaging server 226 and games server 228 monitor end user application utilization which is stored in the subscriber activity data base 210. An end user activity data server 230 communicates with the IPTV system and senses when particular end users are utilizing particular type end user devices, what they are doing on the end user devices and what applications the end users are running. This data is stored along with the end users profile in the end user activity data field 201.

Figure 3:
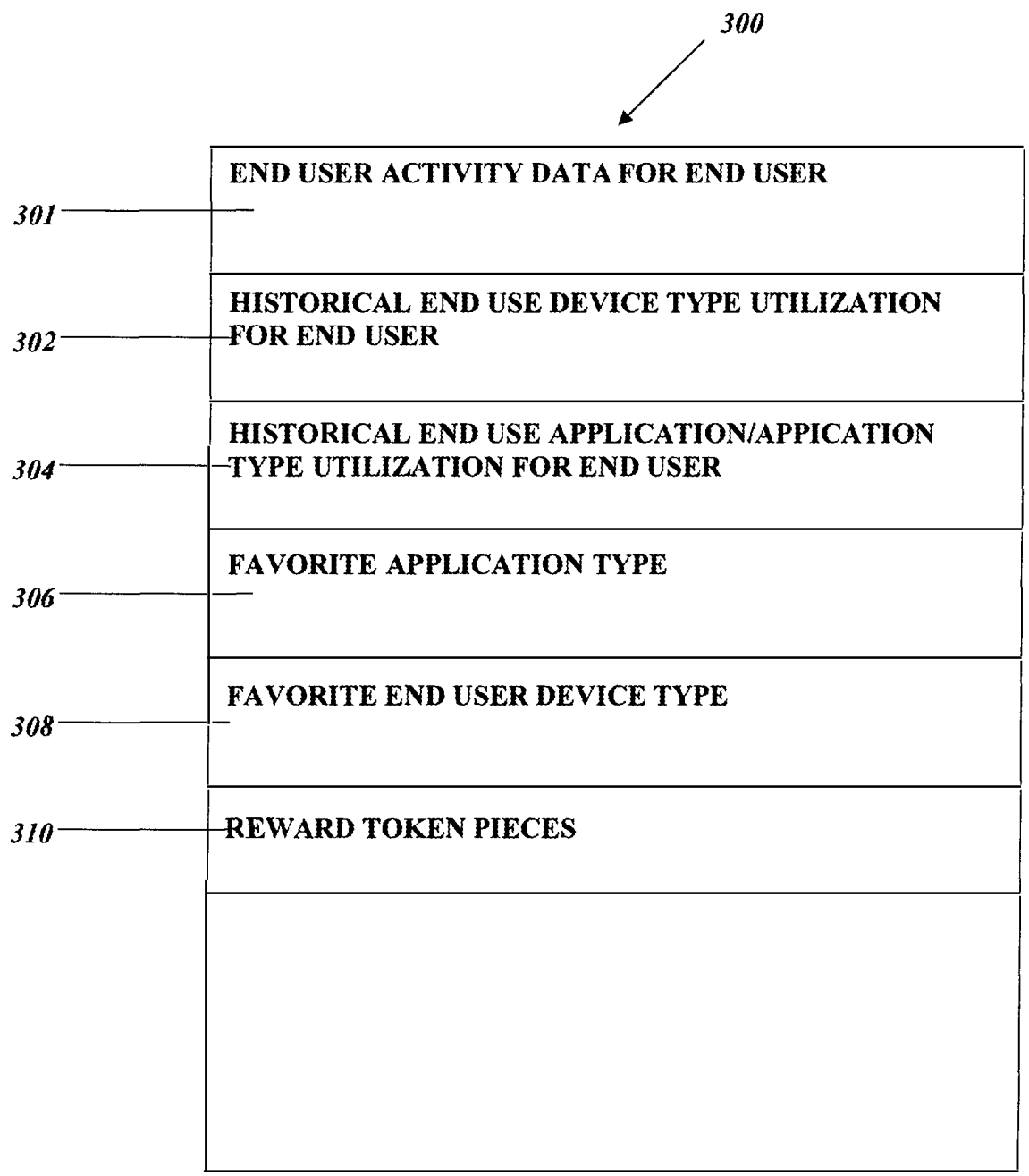
FIG. 3 is a depiction of a data structure embedded in a tangible computer readable medium which stores data for use a method, system and computer program products implementing a particular illustrative embodiment of the invention.

Turning now to FIG. 3, in an illustrative embodiment, the subscriber activity data base 300 is embedded in a computer readable memory and contains data used by the system, method and computer program production disclosed herein. The subscriber activity database 300 includes but is not limited to an end user activity data field 301 for containing data indicating end user activity data for a particular end user. The subscriber activity database 300 includes but is not limited to a historical utilization end user device type field 302 for containing data indicating historical usage of particular device types for a particular end user. The subscriber activity database 300 further includes but is not limited to a historical utilization end user application field 304 for containing data indication historical usage of particular applications for a particular end user. The subscriber activity database 300 further includes but is not limited to an end user application field 306 for containing data indication historical usage of particular end applications for a particular end user. The subscriber activity database 300 further includes but is not limited to an end user device type field 308 for containing data indicating historical usage of particular end user device types for a particular end user. The subscriber activity database 300 further includes but is not limited to a reward token pieces data field 310 for storing data indicating an end user's accumulation of the N reward token pieces.

Figure 4:
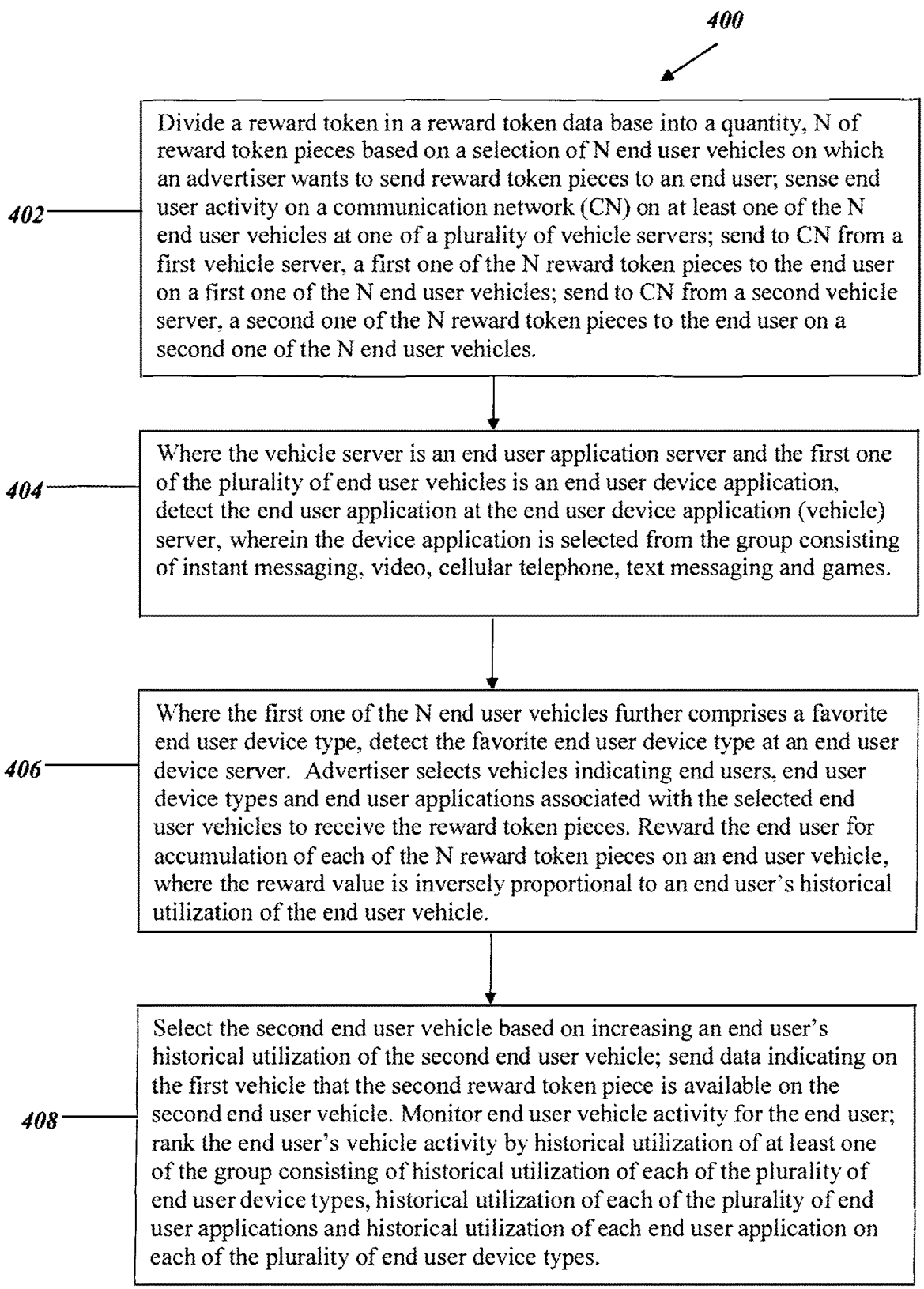
FIG. 4 is a depiction of flow chart of functions performed by a method, system and computer program products implementing a particular illustrative embodiment of the invention.

Turning now to FIG. 4, in a particular illustrative embodiment, the computer program product, method and system perform functions as shown in FIG. 4. No order of function execution is dictated or implied by FIG. 4, as in other embodiments, the order of function execution may differ and additional functions or different function may be executed. As shown in FIG. 4, in block 402, in a particular illustrative embodiment divides a reward token in a reward token data base into a quantity, N of reward token pieces based on a selection of N end user data delivery vehicles on which an advertiser wants to send reward token pieces to an end user; senses end user activity on a communication network (CN) on at least one of the N end user data delivery vehicles at one of a plurality of data delivery vehicle servers; sends to CN from a first data delivery vehicle server, a first one of the N reward token pieces to the end user on a first one of the N end user data delivery vehicles; and sends to CN from a second data delivery vehicle server, a second one of the N reward token pieces to the end user on a second one of the N end user data delivery vehicles.

Proceeding to block 404, a particular illustrative embodiment, where the data delivery vehicle server is an end user application server and the first one of the plurality of end user data delivery vehicles is an end user device application, detects the end user application at the end user device application (data delivery vehicle) server, wherein the device application is selected from the group consisting of instant messaging, video, cellular telephone, text messaging and games. Proceeding to block 406, in a particular illustrative embodiment, where the first one of the N end user data delivery vehicles further includes but is not limited to a favorite end user device type, detect the favorite end user device type at an end user device server. Advertiser selects data delivery vehicles indicating end users, end user device types and end user applications associated with the selected end user data delivery vehicles to receive the reward token pieces. Reward the end user for accumulation of each of the N reward token pieces on an end user data delivery vehicle, where the reward value is inversely proportional to an end user's historical utilization of the end user data delivery vehicle.

Proceeding to block 408, a particular illustrative embodiment, selects the second end user data delivery vehicle based on increasing an end user's historical utilization of the second end user data delivery vehicle; send data indicating on the first data delivery vehicle that the second reward token piece is available on the second end user data delivery vehicle. Monitor end user data delivery vehicle activity for the end user; rank the end user's data delivery vehicle activity by historical utilization of at least one of the group consisting of historical utilization of each of the plurality of end user device types, historical utilization of each of the plurality of end user applications and historical utilization of each end user application on each of the plurality of end user device types.

Figure 5:
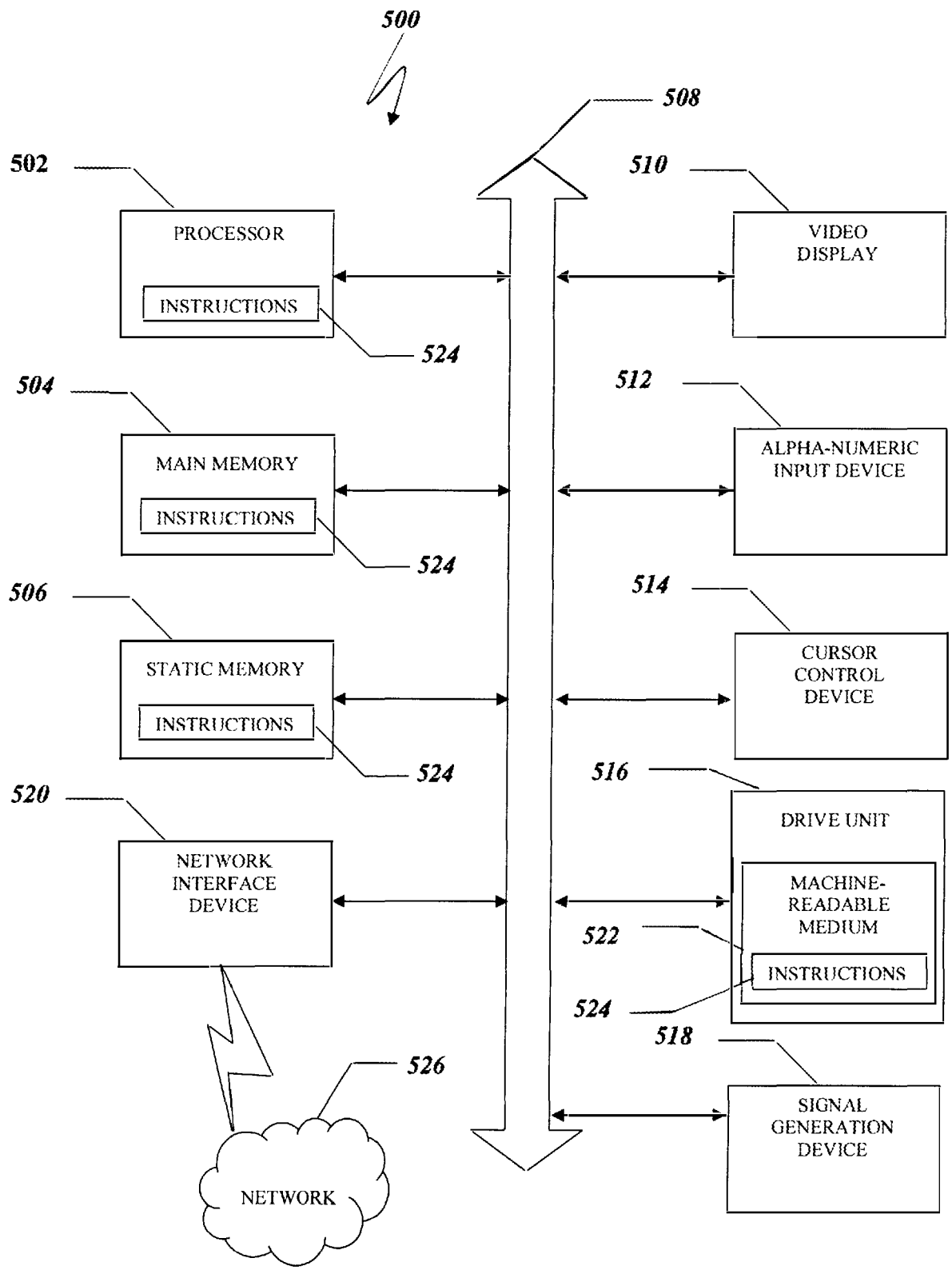
FIG. 5 is a diagrammatic representation of a machine in the form of a computer system within which a set of instructions, when executed, may cause the machine to perform any one or more of the methodologies of the illustrative embodiment.

Turning now to FIG. 5, FIG. 5 is a diagrammatic representation of a machine in the form of a computer system 500 within which a set of instructions, when executed, may cause the machine, also referred to as a computer, to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the terms "machine" and "computer" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., liquid crystals display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a tangible computer-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute computer-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a computer-readable and computer-readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable medium 522 is shown in an example embodiment to be a single medium, the terms "computer-readable medium" and "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the illustrative embodiment. The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

What is claimed is:

1. A method, comprising:

sending, by a server including a processing system comprising a processor, a first sub-token to a device associated with a user, wherein the first sub-token is associated with a preferred activity of the user performed on the device based on an advertising objective, and wherein the device is one of a plurality of devices associated with the user;

sending, by the processing system, an indication of a second sub-token being available from the server, wherein the second sub-token is associated with a second device of the plurality of devices associated with the user;

generating, by the processing system, historical utilization data based on user activity data sent by the plurality of devices to the server;

assigning, by the processing system, values to each device of the plurality of devices according to the historical utilization data and according to the advertising objective;

inserting, by the processing system, a respective amount of sub-tokens of a plurality of sub-tokens into a respective instance of instances of media content data according to a respective value of the values of each of the plurality of devices, wherein the plurality of sub-tokens includes the first sub-token and the second sub-token, and wherein a portion of the plurality of sub-tokens are provided to the device according to activities performed by the user that satisfies the advertising objective;

delivering, by the processing system, the respective instance of instances of the media content data with the respective amount of the sub-tokens to a respective device of the plurality of devices;

monitoring, by the processing system, the plurality of devices to determine which devices conduct an activity consistent with the preferred activity to activate the respective amount of the sub-tokens for the respective device of the plurality of devices as activated sub-tokens;

transferring, by the processing system, the activated sub-tokens to an account associated with the user; and receiving, by the processing system, a request for a reward in exchange for the activated sub-tokens according to the advertising objective.

2. The method of claim 1, further comprising determining a most used end user device of the plurality of devices.

3. The method of claim 2, wherein the advertising objective includes information indicating to the server to target other devices of the plurality of devices other than the most used end user device for the user.

4. The method of claim 1, wherein a reward value of each of the sub-tokens is inversely proportional to a historical utilization of the respective device of the plurality of devices based on the historical utilization data for the user.

5. The method of claim 1, wherein the method further comprises receiving, by the processing system, device data from each respective device of the plurality of devices to provide a reward value to the user for accumulating the portion of the plurality of the sub-tokens, and wherein each respective device of the plurality of devices presents information associated with the respective instance of the instances of the media content data and the respective amount of the sub-tokens assigned to the respective device of the plurality of devices to the server.

6. The method of claim 5, the method further comprising:
selecting a third device of the plurality of devices being a least used device of the plurality of devices based on the historical utilization; and
sending, to a most used end user device, an instruction to present information on the most used end user device that a third respective portion of sub-tokens is available on the third device.

7. The method of claim 1, the method further comprising ranking each of the plurality of devices based on the historical utilization and a second historical utilization of an end user application provided on each of the plurality of devices.

8. The method of claim 7, wherein the ranking further comprises weighting the historical utilization of each of the plurality of devices and the second historical utilization of the end user application based on a target profile of the advertising objective.

9. An apparatus, comprising:
a processing system including a processor; and
a memory that stores executable instructions that, when executed by the processing system, facilitate performance of operations, comprising:
transmitting a first sub-token of a plurality of sub-tokens from a server to a first device associated with a user, wherein the first sub-token is associated with a preferred activity of the user performed on the first device based on an advertising objective, wherein the first device comprises one device of a plurality of devices associated with the user;
transmitting to additional devices of the plurality of devices additional indications of available sub-tokens being available from the apparatus, wherein the first device and the additional devices are selected based on user activity data provided by the plurality of devices to generate historical utilization data for the user;
assigning values to each device of the plurality of devices according to the historical utilization data and the advertising objective;
transmitting media content including the first sub-token, wherein the apparatus inserts a respective amount of sub-tokens of the plurality of sub-tokens into a respective instance of instances of media content data for the media content according to a respective value of the values of each of the plurality of devices including the first device;
monitoring the plurality of devices to determine which devices conduct an activity consistent with the preferred activity to activate the respective amount of the sub-tokens for a respective device of the plurality of devices as activated sub-tokens; and
receiving a report of a performance of the activity consistent with the preferred activity by the user at the apparatus, wherein a reward token database associated with the user accumulates the activated sub-tokens based on the performance of the activity consistent with the preferred activity.

10. The apparatus of claim 9, the operations further comprising determining a most used end user device of the plurality of devices.

11. The apparatus of claim 10, wherein the advertising objective informs the apparatus to target other devices of the plurality of devices other than the most used end user device for the user.

12. The apparatus of claim 9, wherein the operations further comprise transmitting data to indicate a reward value to the user for accumulation of sub-tokens.

13. The apparatus of claim 12, wherein the reward value is inversely proportional to a historical utilization of the respective device of the plurality of devices based on the historical utilization data for the user.

14. The apparatus of claim 9, wherein the operations further comprise receiving a request for a reward in exchange for an amount of sub-tokens in the reward token database.

15. A non-transitory machine-readable storage medium, comprising executable instructions that, when executed by a processing system including a processor, facilitate performance of operations, comprising:
transmitting a first sub-token of a plurality of sub-tokens from a server to a first device associated with a user, wherein the first sub-token is associated with a preferred activity of the user performed on the first device based on an advertising objective, wherein the first device comprises one device of a plurality of devices associated with the user
transmitting to additional devices of the plurality of devices additional indications of available sub-tokens being available from the processing system, wherein the first device and the additional devices are selected based on user activity data provided by the plurality of devices to generate historical utilization data for the user;
assigning values to each device of the plurality of devices according to the historical utilization data and the advertising objective;
transmitting media content including the first sub-token, wherein the processing system inserts a respective amount of sub-tokens of the plurality of sub-tokens into a respective instance of instances of media content data for the media content according to a respective value of the values of each of the plurality of devices including the first device;
monitoring the plurality of devices to determine which devices conduct an activity consistent with the preferred activity to activate the respective amount of the sub-tokens for a respective device of the plurality of devices as activated sub-tokens; and
receiving a report of a performance of the activity consistent with the preferred activity by the user at the first device, wherein a reward token database associated with the user accumulates the activated sub-tokens based on the performance of the activity consistent with the preferred activity.

16. The non-transitory machine-readable storage medium of claim 15, wherein the operations further comprise determining a most used end user device of the plurality of devices.

17. The non-transitory machine-readable storage medium of claim 16, wherein the advertising objective informs the processing system to target other devices of the plurality of devices other than the most used end user device for the user.

18. The non-transitory machine-readable storage medium of claim 15, wherein the operations further comprise transmitting data to indicate a reward value to the user for accumulation of sub-tokens.

19. The non-transitory machine-readable storage medium of claim 18, wherein the reward value is inversely proportional to a historical utilization of the respective device of the plurality of devices based on the historical utilization data for the user.

20. The non-transitory machine-readable storage medium of claim 15, wherein the operations further comprise receiving a request for a reward in exchange for an amount of sub-tokens in the reward token database.

* * * * *